United States Patent

[11] 3,604,551

| [72] | Inventor | Roger H. Fink<br>Asheville, N.C. |
|---|---|---|
| [21] | Appl. No. | 865,589 |
| [22] | Filed | Oct. 13, 1969 |
| [45] | Patented | Sept. 14, 1971 |
| [73] | Assignee | Anchor Hocking Corporation<br>Lancaster, Ohio |

[54] ARTICLE CONVEYOR FLOW CONTROL AND UNSCRAMBLING APPARATUS
6 Claims, 1 Drawing Fig.

[52] U.S. Cl. .................................................. 198/30
[51] Int. Cl. ............................................... B65g 47/26
[50] Field of Search.......................................... 198/30, 32, 102, 19, 29

[56] References Cited
UNITED STATES PATENTS

| 1,852,322 | 4/1932 | Loew............................ | 198/32 |
| 2,629,481 | 2/1953 | Stover.......................... | 198/30 |
| 2,704,146 | 3/1955 | Reck............................ | 198/30 |
| 2,988,195 | 6/1961 | McHugh, Jr.................. | 198/19 |
| 3,258,105 | 6/1966 | Willsey et al................. | 198/30 |
| 3,465,868 | 9/1969 | Donner........................ | 198/32 |

*Primary Examiner*—Andres H. Nielsen
*Attorney*—Norman N. Holland

ABSTRACT: An apparatus for controlling the flow or movement of articles such as containers on a conveyor system and particularly for handling a change from one mode of conveyance to another such as a change from rows of containers on a broad conveyor belt to a single file of containers on a narrow conveyor belt. The rows of containers move from the end of the broad belt across a transfer means such as a vibrating plate onto an unscrambling means comprising several moving conveyors run at right angles across the end of the broad belt. The containers are funneled by a guide means from the unscrambler conveyors into a single-file arrangement on a removal conveyor. An accumulator table is positioned along the edge of the outermost of the three unscrambler conveyors to receive excess containers which cannot be accepted on the removal conveyor and which temporarily stores these containers until they move onto the removal conveyor. The accumulator table comprises a large number of short parallel conveyor belts running at right angles to the unscrambler conveyors and which carry the excess containers away from the unscrambler conveyors towards an L-shaped conveyor return system which returns the containers to the unscrambler conveyors.

PATENTED SEP 14 1971 3,604,551
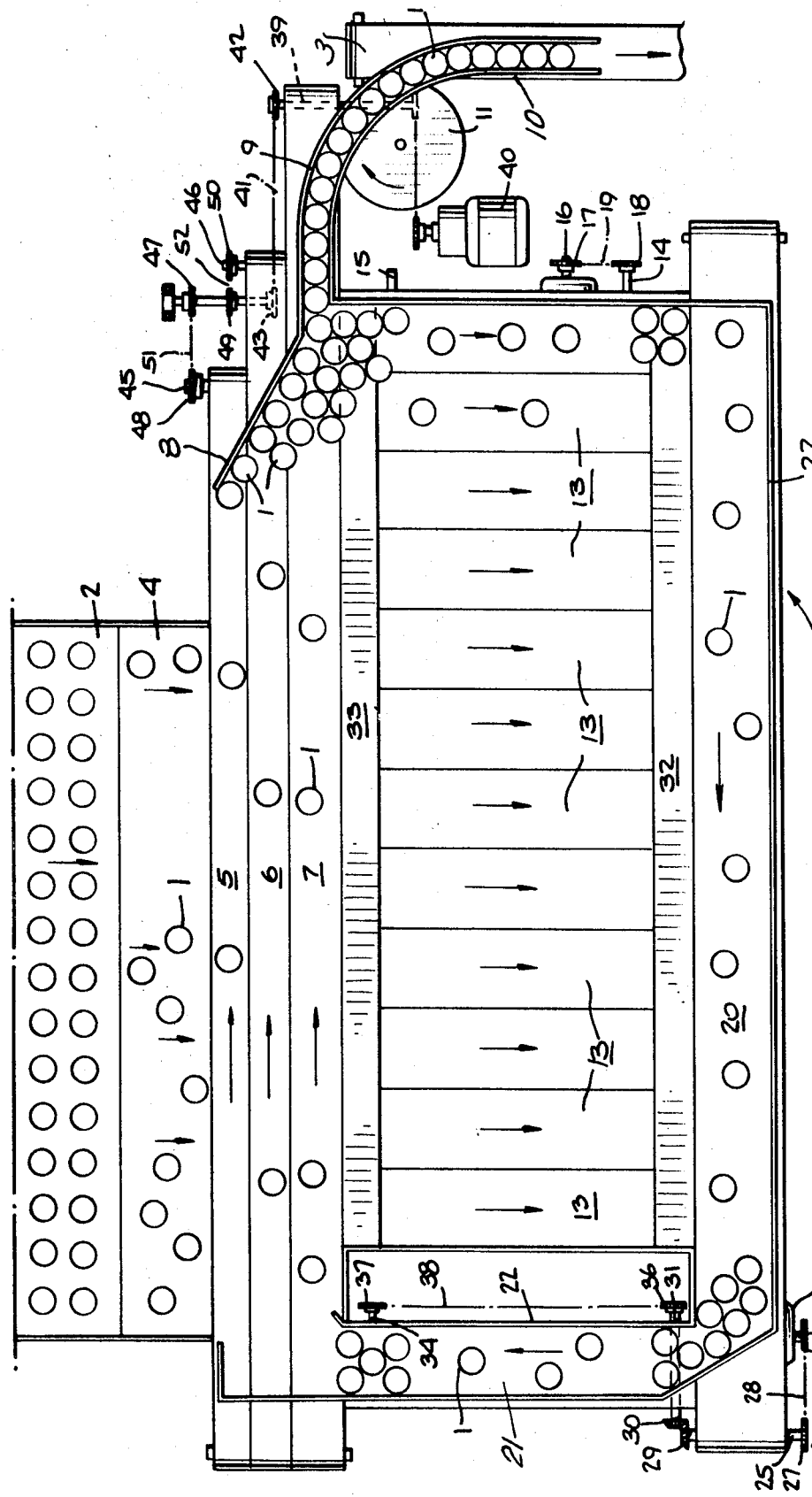
INVENTOR
ROGER H. FINK
Norman M.
Holland
ATTORNEY

ARTICLE CONVEYOR FLOW CONTROL AND UNSCRAMBLING APPARATUS

BACKGROUND OF THE INVENTION

The apparatus of the present invention relates to the controlled movement of articles such as glass containers for transporting them between spaced stations during their manufacture or subsequent handling. It is particularly useful, for example, in transferring rows of containers from a conventional lehr conveyor belt and for guiding the containers into a single-file line on a narrow relatively high-speed removal conveyor belt.

In the transfer of articles, such as containers, from one mode of conveyance to another and between differing transporting means or processing stations, the containers must be first smoothly rearranged and guided from one formation to another. At the same time, the transfer means preferably should also be able to accommodate for a change in the rate of container flow between the first conveyor means and the second conveyor means and it also should be able to compensate for changes in the speed of one conveyor or another. It is possible, for example, for the movement of the containers on the removal belt to be slowed down or stopped for one reason or another so that there is a temporary accumulation of containers at the infeed end of the removal conveyor. At the same time, there may be differences in the supply rate and possible gaps in the flow of the containers from the lehr or the other container feed means. Various accumulators have been previously used including circulating tables of the type shown in the H. E. Stover U.S. Pat. No. 2,629,481 dated Feb. 24, 1953 or belt-type accumulator tables as shown in the C. W. McHugh, Jr. Pat. No. 2,988,195 dated June 13, 1961. The present flow control and accumulating system through its use of a container unscrambling system cooperating with a multibelt accumulating means provides an improved combination of container flow control and guidance with an improved, smoother, and more efficient accumulating action.

SUMMARY OF THE INVENTION

The flow control apparatus of the present invention is useful with a variety of infeed modes for the transported articles, however, it is particularly useful in providing for a transfer of rows of glass containers from a wide conveyor belt such as a lehr belt to a single-file high-speed conveyor belt of the type used to move glass containers through inspecting and packing positions.

Described in a general way, the system includes an unscrambler having several narrow conveyors which are positioned in a parallel arrangement across the end of a transfer plate which passes rows of containers onto the unscrambler conveyors. Such unscramblers are commercially available with several individual belts moving in different speeds towards an exit end and with a return belt moving in the opposite direction at their outer ends. These may be employed with the return belt removed. The first of the narrow unscrambler conveyors, adjacent to the transfer plate, is driven at a fixed speed to carry the rows of containers towards an adjacent and suitably located single-file removal conveyor. The succeeding and parallel unscrambler conveyors are driven at successively higher speeds and in the same direction towards an exit gate leading to the removal conveyor.

A suitably angled guide rail directs the moving containers off of the unscrambler conveyors and onto the removal conveyor where the containers are held in a single-file between spaced guide rails. An accumulating flow control means or table is positioned along the edge of the outermost unscrambler conveyor including the end portion where the conveyors are funneled or guided onto the single-file removal conveyor. This table is adapted to receive excess containers which are prevented from passing onto the single-file conveyor by a stoppage, a slowdown or by a uneven feed rate of containers from the lehr belt. The preferred arrangement of this table includes a series of short parallel conveyor chains or belts which carry the excess containers at slow-speed along paths at right angles to the unscrambler conveyor path. Such flow control tables are commercially available including a return belt running across the entrance ends of the short conveyors. This return belt is removed and is replaced by the unscrambler conveyors in the preferred system described herein. The short conveyors deposit the containers onto a container-collecting return conveyor running across their exit ends. The return conveyor delivers the containers to an end conveyor which carries them back to the entrance end of the unscrambler conveyors for subsequent entry onto the single-file removal conveyor or for further circulating accumulator movement on the table.

Accordingly an object of the invention is to provide an improved article transport system for transferring articles from one conveyor to another and for providing both an unscrambling and a flow-controlling or accumulating action of the moving containers.

Another object of the present invention is to provide an improved flow control and accumulating device for handling a relatively large number of containers in a minimum space and with smooth container movement.

Another object of the present invention is to provide a smoother and more efficient flow control means for moving articles such a glass containers and the like.

Other and further objects of the invention will be obvious upon an understanding of the illustrative embodiment about to be described or will be indicated on the appended claims, and various advantages not referred to herein will occur to one skilled in the art upon employment of the invention in practice.

BRIEF DESCRIPTION OF THE DRAWING

A preferred embodiment of the invention has been chosen for purposes of illustration and description and is shown in the accompanying drawing, forming a part of the specification.

The drawing illustrates in top plan view a preferred embodiment of the flow control system of the present invention illustrating the transfer of rows of containers from a wide conveyor belt to serially aligned containers on a relatively narrow conveyor belt.

DESCRIPTION OF THE PREFERRED EMBODIMENT

A preferred embodiment of the system will now be described as used to transfer rows of containers 1 from a lehr conveyor belt 2 to a single-file container inspection or similar conveyor belt 3. The end portion of the lehr conveyor belt 2 is shown at the top of the drawing carrying rows of containers 1 towards a transfer plate 4 such as a vibrating transfer plate. The vibrator plate 4 is preferably inclined downwardly so that it readily transfers the containers 1 from the lehr belt 2 onto the first belt 5 of three parallel unscrambling or single-liner belts 5, 6 and 7. These belts are mounted on suitable end pulleys which are positioned to place the upper transport surfaces of the belts 5, 6 and 7 in a common plane to permit the ready passage of the containers 1 from one belt to another particularly adjacent to the exit ends of the conveyors. The belts 5, 6 and 7 are driven to carry to containers 1 to their exit ends with their belts being moved at differing speeds to provide the unscrambling action. The belt 5, which is driven at a lower speed with the second belt 6 and the third belt 7 being driven at higher speeds.

For use with glass containers in a typical lehr transfer operation, a preferred ratio of belt speeds drives the first belt 5 at a speed of about 15 to 50 feet per minute and the second belt 6 at an increased speed of about 25 to 75 feet per minute with the final or outermost belt 7 being driven at the highest speed of from about 30 to 90 feet per minute which generally corresponds to the speed of the removal belt 3.

The angularly aligned entrance portion 8 for the guide rails directs the container 1 from the moving unscrambler belts 5, 6 and 7 into the single-file spaced guide rails 9 and 10 and thence onward to whatever exit conveyor system is being used for a particular article handling or manufacturing operation. In the embodiment illustrated, a transfer turntable 11 is shown carrying the line of moving jars through a right-angled turn onto the removal transport conveyor 3. As long as the removal conveyor 3 and the subsequent conveying means are moving the materials at a normal flow rate, all of the containers or other articles arriving at the end of the lehr belt pass onto the unscrambler belts 5, 6 and 7 and then move onto the turntable 11 and the conveyor 3. In the event that there is a slowdown or stoppage or if for some reason the output of the lehr may be temporarily increased, there will be a resulting buildup of materials at the entrance portion 8 of the guide rails 9 and 10.

In order to accommodate this buildup, a flow control table 12 is positioned alongside of the outermost unscrambler conveyor 7. As seen in the drawing, this table 12 includes a series of short parallel container conveyors 13 directed at right angles to the unscrambler conveyors 5, 6 and 7 and driven in a direction to carry the containers 1 away from the unscrambler conveyors 5, 6 and 7. The preferred moving surface of this table comprises the several short conveyors 13 of which 12 are illustrated in the drawing as being a typical number to provide a relatively large storage surface for flow control and temporary accumulator. These conveyors 13 may be mounted on common end shafts 14 and 15 having pulleys to support and drive the belts. A chain link conveyor is suitable for this use. A drive system, preferably having an adjustable speed control, is provided of which the output shaft is illustrated at 16 as coupled to the end shaft 14 through the intermediation of sprockets 17 and 18 and drive chain 19. In a typical lehr feed operation of the type illustrated, these short individual chains 13 may be driven at about 10 to 30 feet per minute.

A common return conveyor 29 is positioned at the exit ends of the individual belts 13 to receive the accumulated containers and to carry the back to the unscrambler belts 5, 6 and 7 along a generally L-shaped path which also includes the end return conveyor 21. Guide rails 22 positioned along the edges of the conveyors 13, 20 and 21 define the return path. The two return conveyors 20 and 21 may be independently driven or driven from a common adjustable drive such as the drive source illustrated at 23 having its output shaft 24 coupled to the conveyor pulley shaft 25 through the intermediation of sprockets 26 and 27 and a drive chain 28. In order to provide for the common drive, the pulley drive shaft 25 for the conveyor 20 is shown coupled by bevel gears 29 and 30 to the end of a shaft 31 which is coupled to the conveyor 21 and driven shaft 34 by sprockets 36 and 37 and chain 38.

While the unscrambler conveyor belts 5, 6 and 7 and the short accumulator belts 13 and the return belts 20 and 21 may be positioned closely adjacent to one another, it is convenient to provide a slight spacing between certain belts and to include a low friction surface such as Teflon or metal transfer plates of the type illustrated at 32 and 33 at the opposite ends of the short accumulator conveyor belts 13.

A drive motor 40 is shown coupled to a drive shaft 39 for the unscrambler belt 7. A jackshaft 41 is driven by sprockets 42 and 43 and chain 44 and it in turn drives end pulley shafts 45 and 46 by appropriately sized sprockets 47, 48, 49 and 50 and chains 51 and 52 to obtain the differing unscrambler belt speeds for belts 5 and 6 as described above.

OPERATION

The operation of the apparatus is clearly illustrated in the drawing. The rows of moving containers 1 are carried by the lehr belt 2 and are deposited onto the smooth upper surface of the transfer plate 4 which is preferably a downwardly inclined and vibrating plate. The rows of containers 1 advance across the plate 4 and pass onto one or more of unscrambler conveyors 5, 6 and 7 depending upon the particular feeding movement of the containers onto and across the vibrator plate. The unscrambler belts 5, 6 and 7 now carry these containers to their exit end and into the entry 8 of the guide rail system. During normal operation, the containers 1 will ultimately strike some portion of the angularly aligned portion 8 of the guide rails or will pass directly into the parallel single-file guide rails 9 and 10 so that the containers move on over the rotating turntable and into the regular single-file conveyor system 11, 13.

In the condition illustrated in the drawing, buildup of containers 1 has occurred at the entry 8 of the guide rails 9 and 10 causing the arriving containers 1 to divert themselves off of the outermost unscrambler conveyor belt 7 and onto the flow control table 12. These containers 1 pass onto one or the other of the flow control belts 13 which move them away from the unscrambler belts 5, 6 and 7. The cooperating L-shaped conveyor path 20, 21 at the rear and at the end of the short accumulator belts 13 receives the accumulated containers 1 and returns them to the entry end of the accumulator belts, 5, 6 and 7. These containers 1 will now be fed as before into the single-file guide rail system 9, 10. If the blockage has not been cleared up, it will be seen that the excess containers 1 will continue to circulate around the table 12 due to the cooperating action of the unscrambler belts 5, 6 and 7 and the accumulator table conveyor belts 13, 20 and 21.

It will be seen that the regular unscrambling action of the parallel unscrambler belts performs its normal operation and also cooperates with the flow control table to provide a compact and smoothly operating flow or surge control. Advantage is thus taken of an improved means for unscrambling and redirecting the container rows into the single file system with an efficient and smoothly operating flow control which not only accumulates the excess containers but which also provides a relatively large storage area for the containers which may be temporarily stored or circulated at this portion of the system.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. An improved apparatus for handling the flow of containers arriving in rows on a relatively broad conveyor belt and for transferring the containers into single-file alignment on a relatively narrow removal conveyor comprising the combination of unscrambler means at the discharge end of said broad conveyor belt for moving the containers in the same direction lengthwise of the rows at differing speeds towards an outlet point adjacent to said removal conveyor, guide means at the outlet point for guiding the containers onto said removal conveyor, a flow control and container accumulating means positioned adjacent to the unscrambler means including means for carrying containers away from said unscrambler means and for thereafter returning the containers to the entrance end of said unscrambler means.

2. The apparatus as claimed in claim 1 in which said unscrambler means comprises a plurality of relatively narrow belts arranged parallel to one another and at right angles to the end of the broad conveyor belt, means for mounting the upper runs of the belt in a common plane, and means for driving said belts at differing speeds toward said outlet point.

3. The apparatus as claimed in claim 1 in which said flow control means comprises a plurality of relatively short container carrying belts in parallel and side-by-side relationship, means for driving the belts in the direction of said broad conveyor, and means for returning containers from the discharge end of said belts to said unscrambler.

4. The apparatus as claimed in claim 1 in which said flow control means comprises a plurality of relatively short container accumulating belts in parallel and side-by-side relationship, meaNs for driving the belts in the direction of said broad conveyor, and belt means for returning containers from the discharge end of said belts to said unscrambler comprising a first return belt running across the discharge ends of said accumulating belts, and a second return belt positioned intermediate the discharge end of said first return belt and said unscrambler means.

5. An improved apparatus for handling the flow of containers arriving in rows on a relatively broad conveyor belt and for transferring the containers into single-file alignment on a relatively narrow removal conveyor comprising the combination of a plurality of relatively narrow unscrambler belts arranged parallel and adjacent to one another and extending at right angles to the broad conveyor, means for mounting the upper runs of said belts in a common plane, means for driving said belts in the same direction and at differing speeds towards an outlet point adjacent to said removal conveyor, guide means mounted to extend diagonally across said belts for guiding the containers into parallel guide rails, spaced generally parallel guide rails positioned for directing containers onto said removal conveyor, a flow control and container accumulating means positioned adjacent to the unscrambler belts and comprising a plurality of relatively short container-accumulating conveyors, means for mounting said accumulator conveyors parallel to one another in side-by-side relationship at right angles to the unscrambling conveyors, means for driving said accumulator conveyors for carrying containers away from said unscrambler belts, and belt means for receiving containers from the ends of said accumulator belts and for returning the to said unscrambler belts.

6. An improved apparatus for handling the flow of containers arriving in rows on a relatively broad conveyor belt and for transferring the containers into single-file alignment of a relatively narrow removal conveyor comprising the combination of a plurality of relatively narrow unscrambler belts arranged parallel and adjacent to one another and extending at right angles to the broad conveyor, means for mounting the upper runs of said belts in a common plane, means for driving said belts in the same direction and at differing speeds towards an outlet point adjacent to said removal conveyor guide means mounted to extend diagonally across said belts for guiding the containers into parallel guide rails, spaced generally parallel guided rails positioned for directing containers onto said removal conveyor, a flow control and container-accumulating means positioned adjacent to the unscrambler belts comprising a plurality of relatively short container carrying belts positioned in parallel and side-by-side relationship, means for driving the belts in the direction of said broad conveyor, and means for returning containers from the discharge end of said belts to said unscrambler.